(12) United States Patent
Michael et al.

(10) Patent No.: US 7,925,829 B1
(45) Date of Patent: Apr. 12, 2011

(54) I/O OPERATIONS FOR A STORAGE ARRAY

(75) Inventors: Ofer E. Michael, Newton, MA (US); Michael J. Scharland, Franklin, MA (US); Alexandr Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 753 days.

(21) Appl. No.: 11/729,707

(22) Filed: Mar. 29, 2007

(51) Int. Cl.
*G06F 12/00* (2006.01)

(52) U.S. Cl. ........ 711/114; 711/117; 711/141; 711/156; 711/170; 711/221

(58) Field of Classification Search .................... None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,148,377 A * | 11/2000 | Carter et al. | 711/147 |
| 2003/0158836 A1* | 8/2003 | Venkatesh et al. | 707/1 |
| 2007/0180188 A1* | 8/2007 | Fujibayashi et al. | 711/112 |

* cited by examiner

*Primary Examiner* — Shawn X Gu
(74) *Attorney, Agent, or Firm* — Muirhead and Saturnelli, LLC

(57) ABSTRACT

Handling I/O operations for a storage array includes distributing metadata among separate memories of a plurality of directors of the storage array, where the metadata correlates logical device data with physical device data. A first one of the directors receives an I/O operation for a particular logical device. Handling I/O operations may also include determining which of the plurality of directors contains metadata corresponding to the particular logical device, and, in response to the metadata being on a different one of the directors, the first director providing a request to the different one of the directors. The directors may be interconnected by an interconnect fabric. The first one of the directors may provide a request to the second one of the directors via the interconnect fabric. Determining which of the plurality of directors contains metadata correspond to the particular logical device may include using a lookup table.

19 Claims, 11 Drawing Sheets

| CALLER | REQUEST | DATA |

FIGURE 11

| RESPONDER | STATUS | DATA |

FIGURE 12

| LOGICAL DEV ID | MD DIR ID | PHY DIR ID | LOGICAL DEV ID | MD DIR ID | PHY DIR ID | ... | LOGICAL DEV ID | MD DIR ID | PHY DIR ID |

FIGURE 9

I/O OPERATIONS FOR A STORAGE ARRAY

BACKGROUND OF THE INVENTION

1. Technical Field

This application relates to computer storage, and more particularly to the field of partitioning computer storage.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, all of which are incorporated by reference herein. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical devices (also referred to as "logical volumes"). The logical devices or may not correspond to the actual disk drives. Allowing multiple host systems to access the single storage device allows the host systems to share data stored therein.

FIG. 1 is a diagram 20 that shows a host 22, a conventional local storage device 24 and a conventional remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it is also possible to use multiple HA's and it is also possible that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c.

The storage space in the local storage device 24 that corresponds to the disks 33a-33c may be subdivided into a plurality of logical devices (also referred to as "logical volumes"). The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of logical volumes or logical devices, where each of the logical devices may or may not correspond to one or more of the disks 34a-34c.

FIG. 2 is a diagram 40 that illustrates an embodiment of the storage device 24 where each of a plurality of directors 42a-42c are coupled to the memory 37. Each of the directors 42a-42c represents one of the RA's 32a-32c, the HA 28, and/or the DA's 38a-38c. In some cases, there may be up to sixtyfour directors coupled to the memory 37, but in other instances there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In the conventional design illustrated by FIG. 1 and FIG. 2, all of the directors share common resources, such as the memory 37, even though the storage device 24 may be used in environments where different unrelated hosts and/or different groups of hosts are performing unrelated activities and thus, do not share any logical storage devices. Such an arrangement may be inefficient in some cases and may even require active allocation of resources, which adds to overhead. Furthermore, since the conventional system illustrated by FIG. 1 and FIG. 2 uses a single operation system to manage the various components of each of the storage devices, then any change to the operating system (e.g., upgrade) would affect the entire storage device 24 and all of the hosts coupled to the storage device 24.

Thus, it is desirable to be able to partition a storage device in a way that eliminates the need for unrelated hosts or groups of hosts to compete for resources and allows for separately modifying the system of each partition in a way that minimizes the effect on other partitions.

SUMMARY OF THE INVENTION

According to the present invention, a storage array includes a plurality of directors, each having at least one processor thereon, a global memory distributed among the plurality of directors, wherein a different portion of the global memory is provided on each of the directors, a interconnect fabric coupled to each of the directors, wherein global memory accesses performed by one director to access memory of another director are through the interconnect fabric, and a plurality of partitioned storage subsystems, each including a separate subset of the directors, wherein each of the partitioned storage subsystems handles I/O operations for a plurality of logical devices independently of I/O operations for logical devices of other ones of the partitioned storage subsystems, the I/O operations using metadata provided in the global memory of the corresponding directors and containing information that correlates logical device data with physical device data. The physical device data may be provided by at least one disk drive coupled to at least one of the directors. The storage array may include a local memory, provided on each of the directors, where the local memory is accessed exclusively by the at least one processor of a corresponding one of the directors. The metadata may include device tables and cache slots. The interconnect fabric may be implemented using an IP network. Memory accesses may be performed using DMA. Each of the directors may include a interconnect fabric interface and wherein the interconnect fabric interface includes DMA hardware.

According further to the present invention, a storage array includes a plurality of directors, each having at least one processor thereon, a global memory distributed among the plurality of directors, where a different portion of the global memory is provided on each of the directors, a interconnect fabric coupled to each of the directors, where global memory accesses performed by one director to access memory of another director are through the interconnect fabric, and metadata for logical devices, provided in the global memory, where the metadata contains information that correlates logical device data with physical device data. The physical device data may be provided by at least one disk drive coupled to at least one of the directors. The storage array may also include a local memory, provided on each of the directors, where the local memory is accessed exclusively by the at least one processor of a corresponding one of the directors. The metadata may include device tables and cache slots. The interconnect fabric may be implemented using an IP network. Memory accesses may be performed using DMA. Each of the directors may include a interconnect fabric interface and the interconnect fabric interface may include DMA hardware.

According further to the present invention, a director for a storage array includes at least one processor, a memory having at least a portion thereof that is accessible by other directors of the storage array, where the portion includes metadata having information that correlates logical device data with physical device data, and a interconnect fabric interface, where memory accesses for the memory of the director are provided to the director through the interconnect fabric interface. The physical device data may be provided by at least one disk drive coupled to at least one of the directors. The memory may include a portion that is accessed exclusively by the at least one processor. The metadata may include device tables and cache slots. The interconnect fabric interface may access an IP network. Memory accesses may be performed using DMA.

According further to the present invention, handling I/O operations for a partitioned storage subsystem includes distributing metadata among separate memories of a plurality of directors of the partitioned storage subsystem, where the metadata correlates logical device data with physical device data, a first one of the directors receiving an I/O operation for a particular logical device, determining which of the plurality of directors contains metadata corresponding to the particular logical device, and, in response to the metadata being on a different one of the directors, the first director providing a request to the different one of the directors. The directors may be interconnected by a interconnect fabric. The first one of the directors may provide a request to the second one of the directors via the interconnect fabric. Determining which of the plurality of directors contains metadata correspond to the particular logical device may include using a lookup table. The physical device data may be provided by at least one disk drive coupled to at least one of the directors. Handling I/O operations for a partitioned storage subsystem may also include determining a particular physical device that corresponds to the particular logical device, determining which of the plurality of directors corresponds to the particular physical device, and, in response to the physical device corresponding to a different one of the directors, the first director providing a request to the different one of the directors. The metadata may include device tables and cache slots.

According further to the present invention, handling I/O operations for a partitioned storage subsystem includes distributing metadata among separate memories of a plurality of directors of the partitioned storage subsystem, where the metadata correlates logical device data with physical device data, a first one of the directors receiving an I/O operation for a particular logical device, determining a particular physical device that corresponds to the particular logical device, determining which of the plurality of directors corresponds to the particular physical device, and, in response to the physical device corresponding to a different one of the directors, the first director providing a request to the different one of the directors. The directors may be interconnected by a interconnect fabric. The first one of the directors may provide a request to the second one of the directors via the interconnect fabric. Determining which of the plurality of directors corresponds to the particular physical device may include using a lookup table. The physical device data may be provided by at least one disk drive coupled to at least one of the directors. Handling I/O operations for a partitioned storage subsystem may also include determining which of the plurality of directors contains metadata corresponding to the particular logical device and, in response to the metadata being on a different one of the directors, the first director providing a request to the different one of the directors. The metadata may include device tables and cache slots.

According further to the present invention, a storage array includes a plurality of directors, each having at least one processor thereon, a global memory distributed among the plurality of directors, where a different portion of the global memory is provided on each of the directors, a interconnect fabric coupled to each of the directors, where global memory accesses performed by one director to access memory of another director are through the interconnect fabric, and metadata for logical devices, provided in the global memory, where the metadata contains information that correlates logical device data with physical device data and where, in response to an I/O operation for a particular logical device, the particular logical device determines which of the plurality of directors contains metadata corresponding to the particular logical device and, in response to the metadata being on a different one of the directors, the first director provides a request to the different one of the directors. The physical device data may be provided by at least one disk drive coupled to at least one of the directors. The storage array may also include a local memory, provided on each of the directors, where the local memory is accessed exclusively by the at least one processor of a corresponding one of the directors. The metadata may include device tables and cache slots. The interconnect fabric may be implemented using an IP network. Each of the directors may include a interconnect fabric interface and the interconnect fabric interface may include DMA hardware.

According further to the present invention, a storage array includes a plurality of directors, each having at least one processor thereon, each of the directors acting as one of: a primary director and a secondary director for a subset of logical devices handled by the storage array, where primary directors actively perform I/O operations for logical devices and wherein secondary directors receive data to mirror memory of a corresponding primary director, a global memory distributed among the plurality of directors, where a different portion of the global memory is provided on each of the directors, and metadata for the logical devices, provided in the global memory, where the metadata contains information that correlates logical device data with physical device data. The physical device data may be provided by at least one disk drive coupled to at least one of the directors. The storage array may also include a local memory, provided on each of the directors, where the local memory is accessed exclusively by the at least one processor of a corresponding one of the directors. The metadata may include device tables and cache slots. The interconnect fabric may be implemented using an IP network. Memory accesses may be performed using DMA. Each of the directors may include a interconnect fabric interface and the interconnect fabric interface may includes DMA hardware.

According further to the present invention, associating primary directors with logical devices includes providing a criteria for assigning each director of a partitioned storage subsystem to be a primary director for a subset of logical devices and assigning each of the directors to be a primary director for at least one logical device. The criteria may include assigning each director to be a primary director for an approximately equal number of logical devices as the other directors. The criteria may include assigning each director to be a primary director for logical devices so that the access load is approximately equal for the directors. The partitioned storage subsystem may include a global memory distributed among the plurality of directors, where a different portion of the global memory is provided on each of the directors. The partitioned storage subsystem may include metadata for the logical devices, provided in the global memory, where the metadata contains information that correlates logical device data with physical device data. The physical device data may be provided by at least one disk drive coupled to at least one of the directors. The metadata may include device tables and cache slots. Each of the directors may include a local memory that is accessed exclusively by the at least one processor of a corresponding one of the directors.

According further to the present invention, computer software, provided in a computer readable storage medium, includes executable code that provides a criteria for assigning each director of a partitioned storage subsystem to be a primary director for a subset of logical devices and executable code that assigns each director to be a primary director for at least one logical device. The criteria may include assigning each director to be a primary director for an approximately equal number of logical devices as the other directors. The criteria may include assigning each director to be a primary director for logical devices so that the access load is approximately equal for the directors. The partitioned storage subsystem may include a global memory distributed among the plurality of directors, where a different portion of the global memory is provided on each of the directors. The partitioned storage subsystem may include metadata for the logical devices, provided in the global memory, where the metadata contains information that correlates logical device data with physical device data.

The advantages of the system described herein include improved failure isolation as well as providing a mechanism for parallel independent upgrades and independent testing. The system is designed so that modification to one of the partitioned storage subsystems has little or no impact on other partitioned storage subsystems. In addition, the different partitioned storage subsystems may communicate with each other without the need for additional cabling and/or other interconnection provisions (e.g., a SAN) but still may be managed using a single management console (or similar) coupled to the storage array.

Transferring I/O operations to a director having a portion of the global memory that contains corresponding metadata reduces the number of non-native global memory accesses and thus is more efficient. Transferring I/O operations among directors may also improve board utilization and port utilization (connectivity to a single port) and may eliminate constraints on the number of logical devices that may use a single port.

Distributing logical devices among directors in a partitioned storage subsystem such that each director is a primary director for approximately the same number of logical devices (or approximately the same I/O access load) provides better utilization of the directors.

BRIEF DESCRIPTION OF DRAWINGS

FIG. 9 is a diagram showing a table that may be used to correlate logical devices with corresponding director boards containing metadata and coupled to physical devices according to an embodiment of the system described herein.

FIG. 11 is diagram illustrating a data structure that may be used for sending data requests from one director board to another according to an embodiment of the system described herein.

FIG. 12 is diagram illustrating a data structure that may be used for servicing data requests from one director board to another according to an embodiment of the system described herein.

DETAILED DESCRIPTION OF VARIOUS EMBODIMENTS

Figure 3:
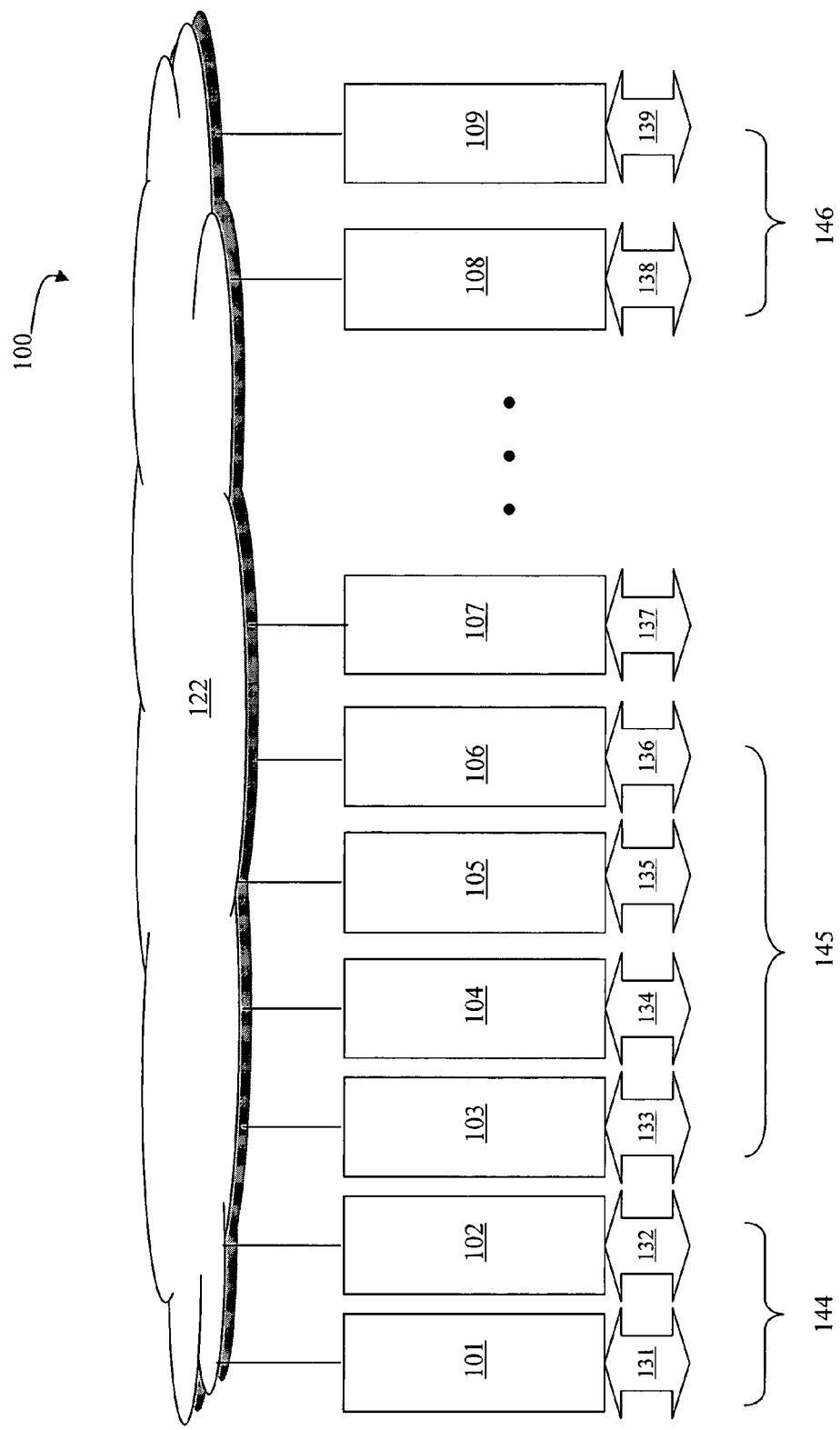
FIG. 3 is a diagram showing a storage array having director boards, partitioned storage subsystems, and a interconnect fabric according to an embodiment of the system described herein.

Referring to FIG. 3, a diagram shows a storage array 100 that includes a plurality of director boards 101-109 that perform functions like the directors 42a-42c, described above. In some embodiments, one or more of the director boards 101-109 may have multiple independent processor systems thereon and may be able to provide an emulation instance for more than one independent director, including simultaneously providing emulation instances for at least two different types of directors (e.g., an HA and a DA) on a single one of the director boards 101-109. In an embodiment herein, the director boards 101-109 each have eight independent processor systems, but more or less processor systems are also possible.

Accordingly, each director board may contain a plurality of director emulation instances running thereon although many of the features described herein work in cases where each of the director boards 101-109 has a single director emulation instance. Thus, for the discussion that follows, the term "director" should be understood as referring to a director board and/or a director emulation instance running on a director board, as appropriate.

The storage array 100 does not use a global memory like the global memory 37 of the storage device 24. Instead, as described in more detail elsewhere herein, the global memory may be distributed between, and shared by, the director boards 101-109. The storage array 100 may include a interconnect fabric 122 that allows the director boards 101-109 to communicate with other ones of the director boards 101-109. The interconnect fabric 122 may be implemented using any appropriate technology that allows data to be passed between the director boards 101-109. In some cases, DMA may be used to transfer data from the memory of one of the director boards 101-109 to the memory of another one of the director boards 101-109 with minimal processor involvement. Appropriate DMA technologies include the InfiniBand technology and/or technology according to the IP RFC 4297 standard. In other instances, processor controlled transfers may be used. Of course, it is possible to simultaneously use both (i.e., combine) DMA transfers and processor controlled transfers.

A plurality of director links 131-139 may be provided to facilitate communication from each of the director boards 101-109 to one or more hosts coupled to the storage array 100, to one or more disk drives of the storage array 100, and/or to one or more remote data transfer connections to other storage devices and/or other storage arrays. If one of the director boards 101-109 includes an HA director emulation instance, then the corresponding one of the links 131-139 includes a link to one or more hosts. If one of the director boards 101-109 includes a DA director emulation instance, then the corresponding one of the links 131-139 may be coupled to one or more disks. If one of the director boards 101-109 includes an RA director emulation instance, then the corresponding one of the links 131-139 may be coupled to one or more remote storage devices/storage arrays (and/or to an interface thereof). In an embodiment herein, each of the director boards 101-109 includes eight processors and may simultaneously provide director emulation instances for a DA, an HA, and/or an RA. Thus, the link types may be combined for one or more of the director boards 101-109 to facilitate the combination of director emulation instances.

In some embodiments, data provided between director boards 101-109 via the interconnect fabric 122 may be either pulled (requested by a director emulation instance on a director board) or pushed (sent from one director board to another without any request being made by the destination director emulation instance), depending on the situation. For example, a first one of the director boards 101-109 may be coupled to a host that requests data from a drive that is coupled to a second one of the director boards 101-109. In such a case, an emulation instance of the first one of the director boards 101-109 may pull the data from an emulation instance of the second one of the director boards 101-109. As another example, the host may write data to be stored on a disk drive, in which case the data may be pushed from an emulation instance of the first one of the director boards 101-109 to an emulation instance of the second one of the director boards 101-109.

The director boards 101-109 may be grouped to form partitioned storage subsystems. For example, the director boards 101, 102 may be grouped to form a first partitioned storage subsystem 144, the director boards 103-106 may be grouped to form a second partitioned storage subsystem 145, and the director boards 108, 109 may be grouped to form a third partitioned storage subsystem 146. Of course, any number of partitioned storage subsystems may be formed; the actual number may vary according to the number of director boards available and the number of director boards used for each partitioned storage subsystem.

Each of the partitioned storage subsystems 144-146 may have its own global memory space (distributed among the corresponding director boards) and may operate independently of other partitioned storage subsystems. However, as discussed in more detail elsewhere herein, it may also be possible for one or more of the partitioned storage subsystems 144-146 to communicate with other ones of the partitioned storage subsystems 144-146 using, for example, the interconnect fabric 122 or some other appropriate mechanism.

Figure 4:
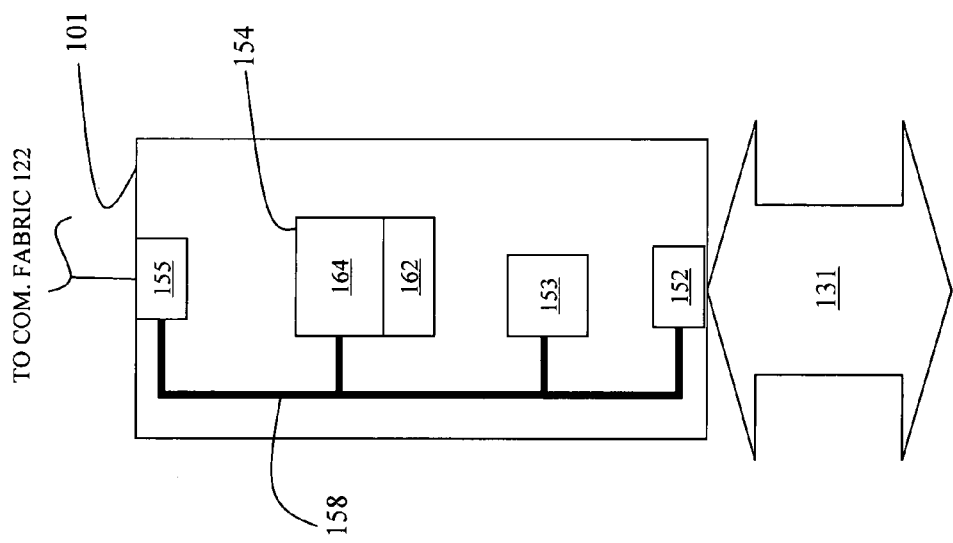
FIG. 4 is a diagram showing a director board including a link interface, one or more processors, memory, and a interconnect fabric interface according to an embodiment of the system described herein.

Referring to FIG. 4, the director board 101 is shown in more detail as including a link interface 152, one or more processors 153, a memory 154, and a interconnect fabric interface 155, all of which are interconnected by an internal bus 158 that facilitates communication therebetween. The director board 101 is meant to be exemplary of other ones of the director boards 102-109. The link interface 152 may perform the functionality of interfacing with one or more hosts, disk units, and/or connections to remote storage devices and/or storage arrays. The processors 153 provide one or more director emulation instances described in more detail elsewhere herein.

The memory 154 may be subdivided into a local memory portion 162 and a global memory portion 164. The local memory portion 162 may be accessed solely by the processors 153 of the director board 101 in connection with the one or more director emulation instances therefor. The global memory portion 164, on the other hand, may be accessed by the processors 153 as well as by other ones of the director boards 102-109, as described in more detail elsewhere herein.

The interconnect fabric interface 155 facilitates communication between the director board 101 and the other director boards 102-109 via the interconnect fabric 122. The interconnect fabric interface 155 may be implemented in any appropriate fashion, using, for example, conventional communication hardware depending upon the mechanism used to provide the interconnect fabric 122. For example, the interconnect fabric 122 may be implemented using an internal Ethernet network/switch, in which case the interconnect fabric interface 155 may be implemented using a conventional Ethernet adapter. Note also that in instances where DMA is used to transfer data between the memory 154 and the other director boards 102-109 (or any other data source/sink), DMA hardware (e.g., conventional DMA hardware) may be used with and/or integrated with the interconnect fabric interface 155.

Of course, in instances where the director board 101 is running multiple director emulation instances, the emulation instances may communicate internally using the global memory 164, using the local memory 162, using the internal bus 158 in some fashion, or using any other appropriate mechanism. Thus, for example, an HA emulation instance running on the director board 101 may communicate internally with a DA emulation instance running on the director board 101 without having to use the interconnect fabric 122.

Figure 5:
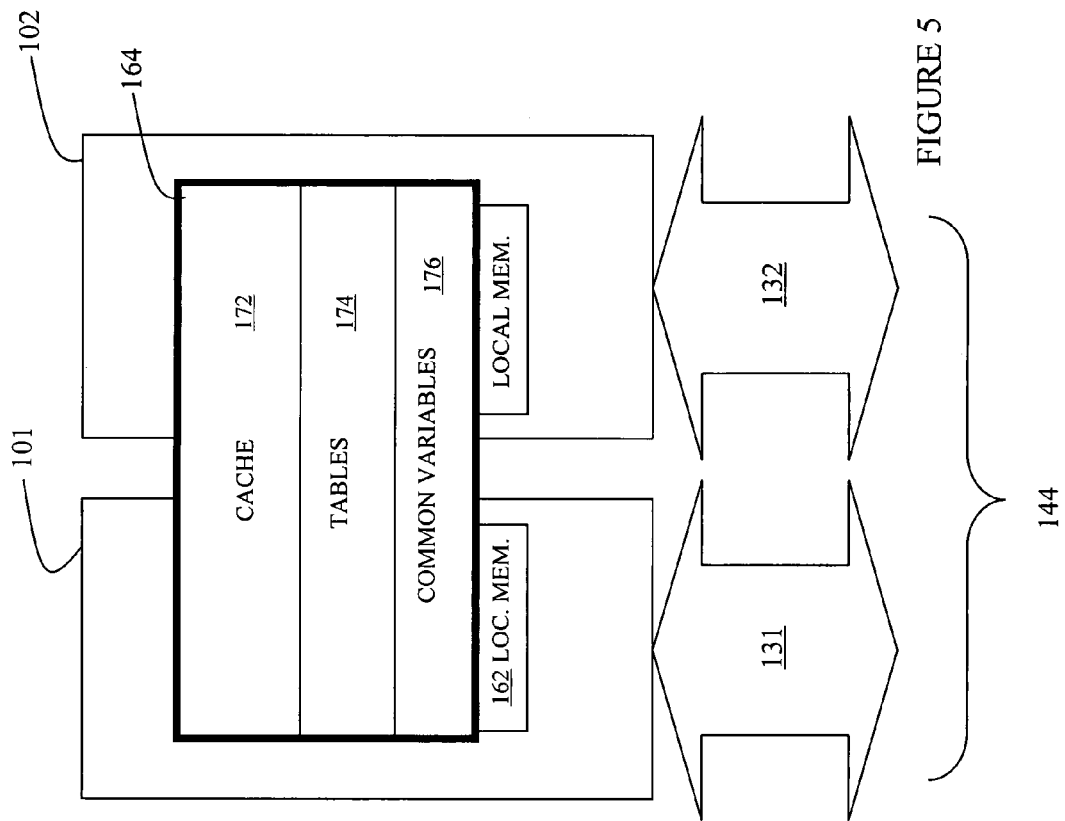
FIG. 5 is a diagram showing a partitioned storage subsystem having two director boards according to an embodiment of the system described herein.

Referring to FIG. 5, the partitioned storage subsystem 144 is shown as including the director board 101 and the director board 102. The global memory 164 is shown figuratively as spanning both of the director boards 101, 102 to illustrate that the global memory 164 is mirrored between and shared by the director boards 101, 102. Each of the director boards 101, 102 is shown as having its own local memory (e.g., the local memory 162 of the director board 101). One of the director boards 101, 102 may be configured to be a mirror of the other one of the director boards 101, 102 so that, should one of the director boards 101, 102 fail, the other one of the director boards 101, 102 may continue operation. Such mirroring may be provided in connection with partitioned storage subsystems having any number of director boards greater than one in order to provide redundancy and avoid a single point of failure. Note that mirroring may include providing mirrored director emulation instances in the director boards.

In some embodiments, some of the director emulation instances on one of the director boards 101, 102 may act as the primary director by directly handling all of the transactions while corresponding director emulation instances on the other one of the director boards 101, 102 acts as a secondary director by simply receiving data (e.g., via the interconnect fabric interface 155) to allow the secondary director emulation instance to mirror the global memory 164 written by the primary director emulation instance. As discussed elsewhere herein, in other embodiments it may be possible to have emulation instances on each of the directors 101, 102 act as primary and secondary directors for different subsets of logical devices.

Figure 1:
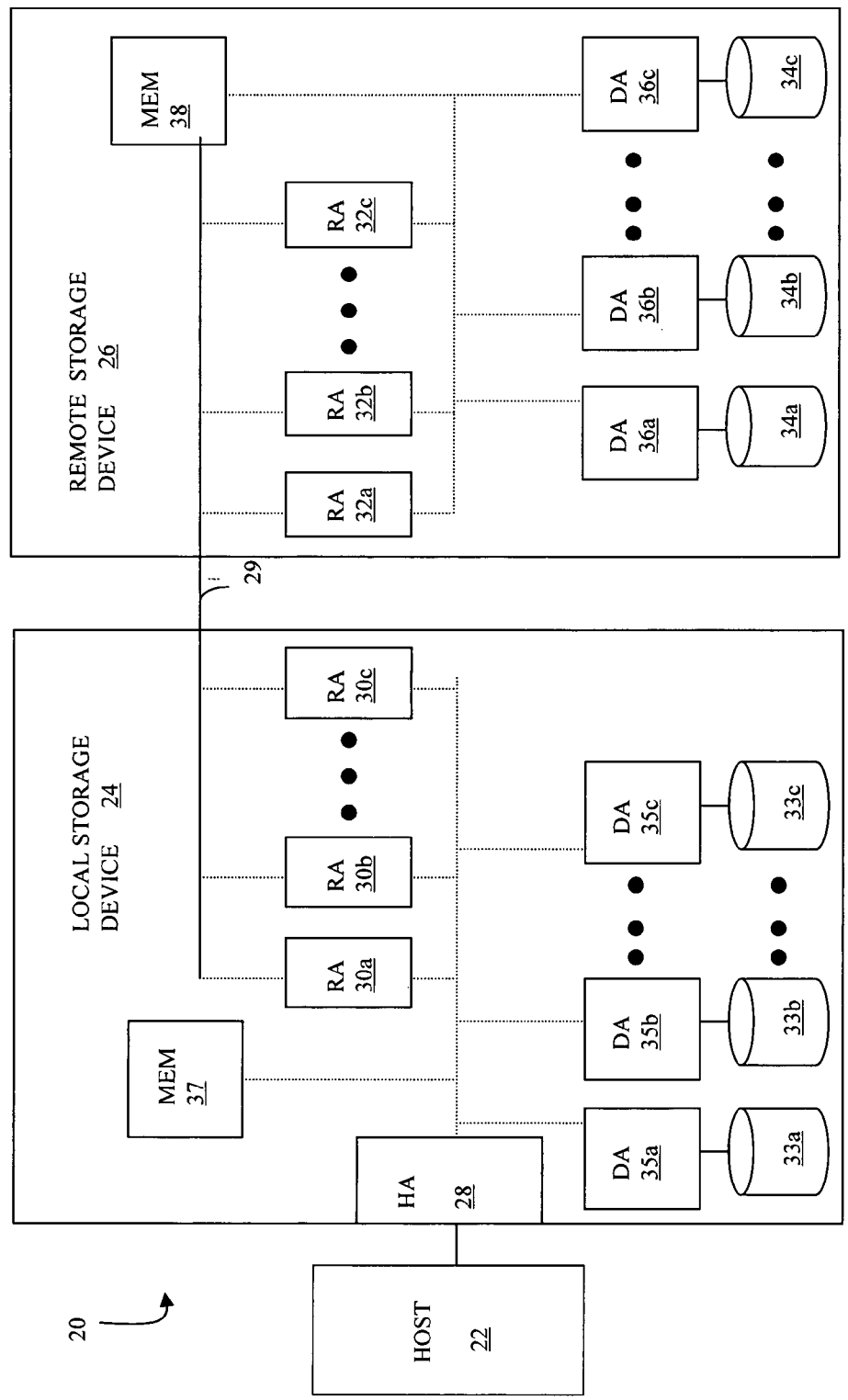
FIG. 1 is a schematic diagram showing a host, a conventional local storage device, and a conventional remote data storage device.
Figure 2:
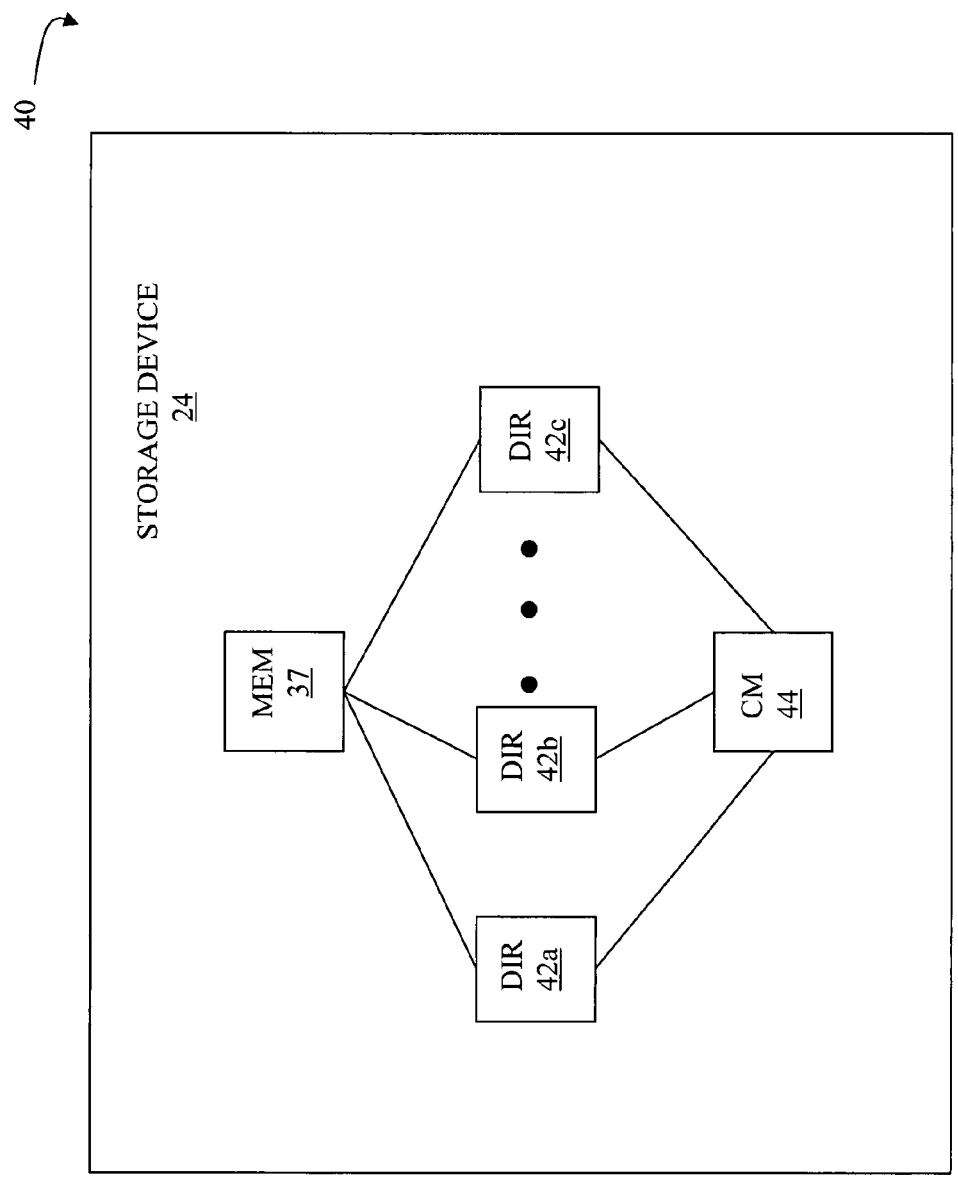
FIG. 2 is a diagram showing a conventional storage device having a memory, a plurality of directors, and a communication module.

The global memory 164 is similar to global memory used by conventional storage devices 24, 26 illustrated in FIG. 1 and FIG. 2 in that the global memory 164 includes a cache portion 172, a tables portion 174, and a common variables portion 176. The cache portion 172 includes data read from and/or to be written to one or more disks of the storage array 100. The tables portion 174 includes information for establishing and using logical devices. Data used in the tables portion 174 is discussed in more detail elsewhere herein. The common variables portion 176 includes variables used by different processes of the partitioned storage subsystem 144, including processes that handle logical device I/O operations.

Note that, in the case of a partitioned storage subsystem that uses more than two director boards, it is possible that a global memory location accessed by a primary director board will not be on the primary director board. For example, in the simple case of a partitioned storage subsystem that uses four director boards (like the partitioned storage subsystem 145), the global non-mirrored memory directly accessed by the primary director boards may be split between the primary director boards. As discussed in more detail elsewhere herein, it may be desirable to reduce the number of times a processor on one director board accesses global memory located on another director board.

Figure 6:
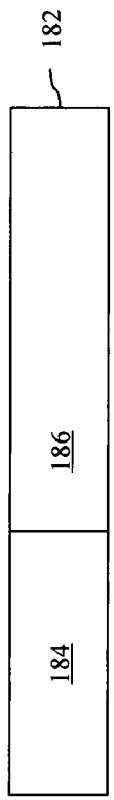
FIG. 6 is a diagram illustrating addressing distributed global memory according to an embodiment of the system described herein.

Referring to FIG. 6, a memory address 182 is shown as including an upper portion 184 and a lower portion 186. The processors of the director boards 101-109 may address global memory using memory addresses like the address 182 shown in FIG. 6. In an embodiment herein, the upper portion 184 indicates which of the director boards 101-109 contains the accessed data while the lower portion 186 indicates the specific address of the data within the one of the director boards 101-109. Of course, other addressing mechanisms are also possible, where the other mechanisms indicate which particular one of the director boards 101-109 contains the data being addressed as well as a memory address within the particular one of the director boards 101-109.

Figure 7:
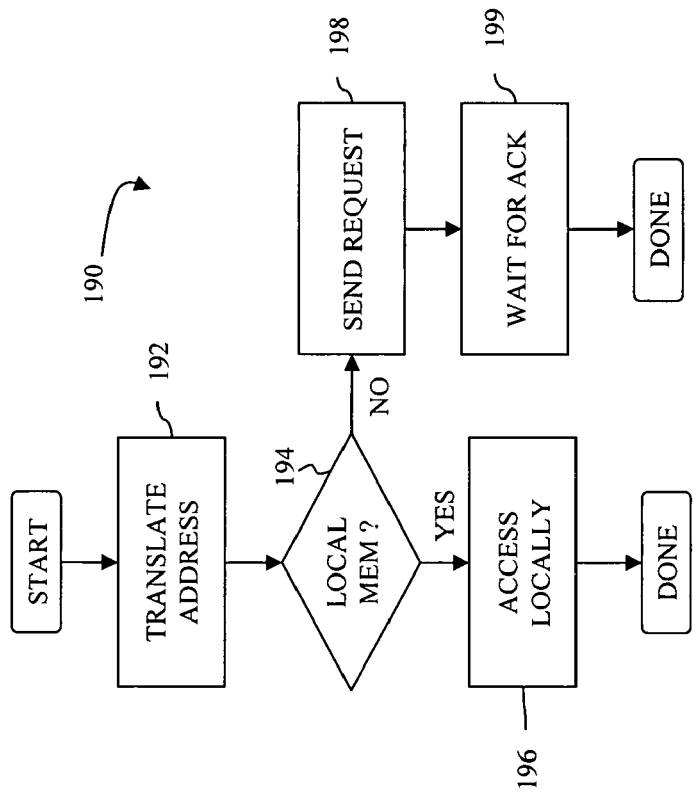
FIG. 7 is a flow chart illustrating steps performed in connection addressing distributed global memory according to an embodiment of the system described herein.

Referring to FIG. 7, a flow chart 190 illustrates steps performed by one or more of the processors 153 of the director board 101 (or other processors of the other director boards 102-109) in connection with a global memory access. As mentioned above, since the global memory is distributed among the director boards 101-109, then a global memory access by one or more of the processors 153 within the director board 101 may either access the memory 154 of the director board 101 or may access memory on another one of the director boards 102-109 through the interconnect fabric 122.

Processing begins at a first step 192 where the address is translated to determine which particular one of the director boards 101-109 contains the data and the memory address of the data within the particular one of the director boards 101-

109. In an embodiment herein, the address may be translated according to the mechanism illustrated in FIG. 6, although other mechanisms are also possible. Following the step 192 is a test step 194 where it is determined if the data being accessed is located in the local memory 154 of the director board 101 or located in a memory of another one of the director boards 102-109. If the access is for data in the memory 154 (native memory access), then control transfers from the test step 194 to a step 196 where the memory 154 is locally accessed by one or more of the processors 153 of the director board 101. Following the step 196, processing is complete.

If it is determined at the test step 196 that the data being accessed is located in a memory of another one of the director boards 102-109 (non-native memory access), then control transfers from the test step 194 to a step 198 where an appropriate request is sent (e.g., via the interconnect fabric 122) to the one of the director boards 102-109 where the data being accessed is located. In the case of DMA being used for inter-director board data transfers, the processing at the step 198 includes setting up and sending appropriate DMA requests. Of course, if other types of data transfer mechanisms are used, corresponding appropriate steps are performed at the step 198.

Following the step 198 is a step 199 where an acknowledgement is handled. For example, in the case of a DMA transfer, the DMA mechanism may automatically cause the data to be transferred from another one of the director boards 102-109 to the memory 154 and then, upon completion of the transfer, a signal will be provided indicating completion. Any appropriate signal mechanism may be used, such as an interrupt or setting a flag. Other types of acknowledgements may be used, including different types of acknowledgements for different types of transfers. Following the step 199, processing is complete.

The processing illustrated by the flow chart 190 of FIG. 7 may be used to facilitate providing a level of abstraction such that global memory is accessed by processors of the director boards 101-109 as if the memory were a single monolithic memory array even though global memory is distributed among the director boards 101-109. Accordingly, global memory accessing functionality may be provided by specialized hardware, software, or a combination thereof.

As mentioned above, it is possible to provide logical devices (logical volumes) using the physical devices (e.g., disk drives), where there is not necessarily a direct correlation between physical devices and logical devices. A physical device may contain data for more than one logical device and/or a logical device may span more than one physical device. This may be managed by use of device tables that maintain information for logical devices that relates logical device space to physical storage space.

Figure 8:
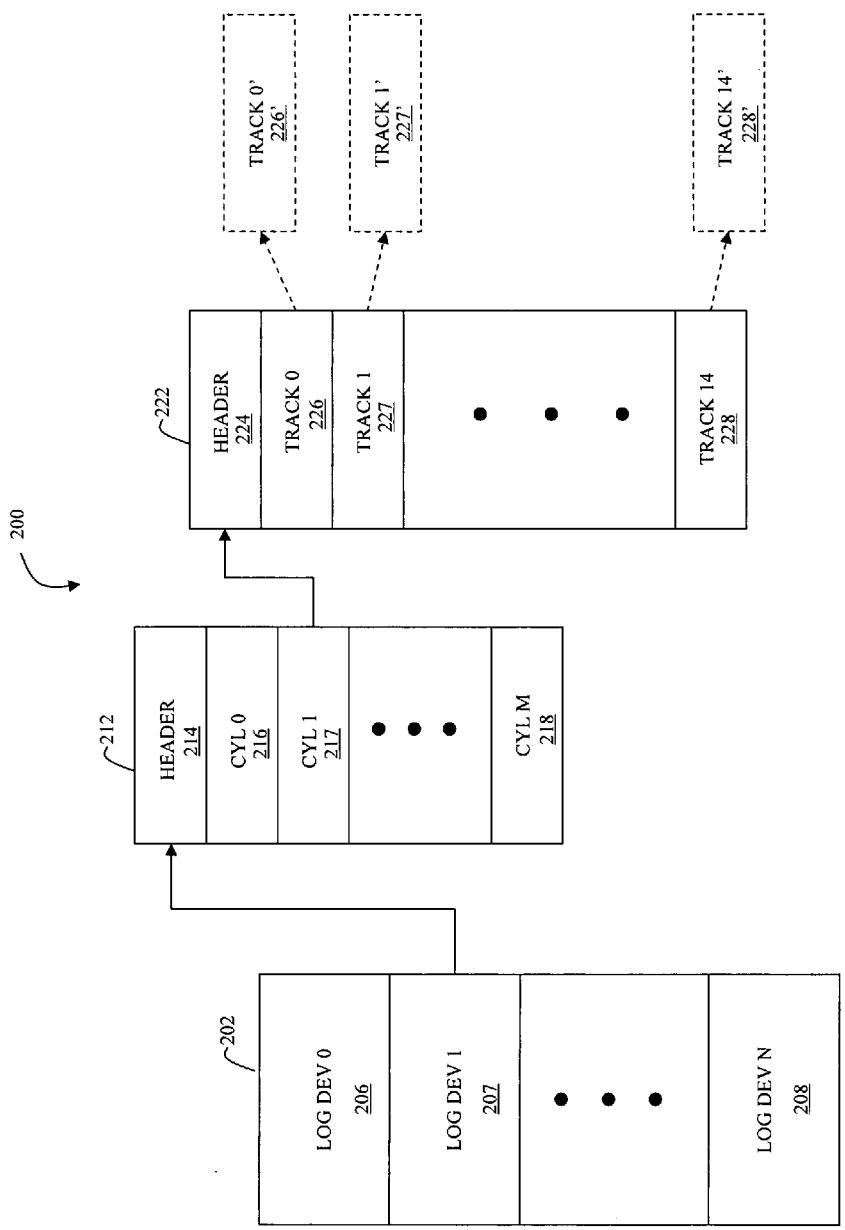
FIG. 8 is a diagram showing device tables according to an embodiment of the system described herein.

Referring to FIG. 8, a diagram 200 illustrates correlation between logical devices and physical storage space. A first table 202 contains information for all logical devices of a partitioned storage subsystem. In some embodiments logical devices may be pre-configured prior to use of the partitioned storage subsystem. In other embodiments logical devices may be allocated and deallocated dynamically during run time while in still other embodiments logical devices may be preconfigured or allocated and deallocated dynamically. Any other appropriate mechanism or combination of mechanisms may be used to specify logical devices. The information in the table 202 (and any other tables described herein) may be provided in an array, a linked list, a doubly linked list, or any other appropriate data structure.

The table 202 includes a plurality of logical device entries 206-208 that correspond to all the logical devices used by the partitioned storage subsystem. Each of the entries 206-208 of the table 202 corresponds to another table that contains information for each of the logical devices. For example, the entry 207 may correspond to a table 212. The table 212 includes a header that contains overhead information (metadata) for the logical device 207. The table 212 also includes entries 216-218 for each of the cylinders of the logical device. In an embodiment herein, a logical device may contain any number of cylinders depending upon how the logical device is initialized/specified. However, in other embodiments, a logical device may contain a fixed number of cylinders.

Each of the cylinder entries 216-218 may correspond to a track table by, for example, pointing to a track table or being a track table. For example, the entry 217 may correspond to a track table 222 that includes a header 224 having overhead information (metadata). The track table 222 also includes entries 226-228 for each of the tracks. In an embodiment herein, there are fifteen tracks for every cylinder. However, for other embodiments, it may be possible to have different numbers of tracks for each of the cylinders or even a variable number of tracks for each cylinder. The tracks may be CKD formatted tracks, FBA formatted tracks, or any other type of tracks. Different track formats are disclosed, for example, in U.S. Pat. No. 5,206,939 to Yanai, et al., which is incorporated herein by reference.

For some embodiments, the information in each of the entries 226-228 includes a pointer (either direct or indirect) to the physical address of a track on a disk drive so that the track table 222 may be used to map logical device addresses to physical addresses. In such a case, the entry 226 may point to a physical track 226', the entry 227 may point to a physical track 227', and the entry 228 may point to a physical track 228'. In other embodiments, the track table 222 may correspond to physical storage space (e.g., a contiguous section of storage space on a disk drive), in which case, the tracks 226'-228' would not be present since the tracks 226-228 represent physical storage.

The tables 202, 212, 222 may be stored in global memory 164 along with other logical device metadata such as the common variables and the cache. The metadata is used by I/O routines to present logical devices to calling routines and to translate operations performed on logical devices by calling routines into appropriate physical storage accesses. Thus, for example, a host coupled to the director board 101 (shown in FIG. 5) via the link 131 may perform an I/O operation that causes metadata from the global memory 164 to be accessed and/or modified. Similarly, an I/O operation may use a physical disk drive coupled to the director 102 via the link 132, in which case metadata from the global memory 164 may be accessed and/or modified.

As discussed elsewhere herein, global memory may be distributed among the director boards 101-109, but a portion of the global memory provided on any one of the director boards 101-109 may be accessed by any other one of the director boards 101-109 using an appropriate mechanism, such as DMA via the interconnect fabric 122. Accordingly, the distribution of I/O operations, physical devices, metadata, etc. may be handled by a DMA accesses to global memory. Thus, it is possible to have a host that is coupled to a first director board perform an I/O operation for a logical device where the metadata for the logical device is provided in a portion of the global memory that is located on a second director board. Further, it is possible that the I/O operation accesses a physical storage area (disk) coupled to a third director board.

In a system where accessing a portion of a distributed global memory that is on a different director board (non-native global memory accesses) takes more time (and resources) than accessing a portion of the distributed global memory on the same director board (native global memory accesses), it may be advantageous to maximize native global memory accesses while minimizing non-native global memory accesses. Since a single I/O operation may require a number of accesses to corresponding metadata, it may be useful to cause I/O operations for a logical device to be performed by a director board containing a portion of the global memory in which metadata for the logical device is located.

Referring to FIG. 9, a table 240 may be used by each of the director boards 101-109 to correlate each logical device of a partitioned storage subsystem with a particular director board having a portion of global memory that contains the metadata for the logical device. The table 240 may also correlate each logical device with a particular director board that is coupled to the physical storage (disk) corresponding to the logical device. In some embodiments, logical devices do not span more than one physical device. For other embodiments where logical devices may span more than one physical device, the table 240 may contain information for all of the physical devices or the table may contain information for one of the physical devices (e.g., the predominant physical device). The table 240 contains a plurality of entries 242-244, where each entry corresponds to a particular logical device of a partitioned storage subsystem.

Each of the entries 242-244 contains information identifying a particular logical device, identifying a director board on which a portion of the global memory 164 containing the metadata for the logical device is located, and, in some embodiments, information identifying the director board that is coupled to the physical storage (disk) containing the data for the logical device. In some embodiments, N logical devices of a partitioned storage subsystem are identified with a number from zero to N−1, in which case the identifying number may be used to index the table. In such a case, it may not be necessary to include information identifying the logical devices in the table 240.

The table 240 may be implements using an array, a linked list, and/or any appropriate data structure. In an embodiment herein, each of the director boards 101-109 may have a copy of the table 240, which may be initially stored in a portion of the global memory 164 and then copied by each of the director boards 101-109 to local memory, such as the memory 162 of the director board 101 shown in FIG. 4. In some embodiments, the configuration of the logical devices, and thus the table 240, remains constant. In other embodiments, logical devices may be configured dynamically, in which case there may be a mechanism to notify the director boards 101-109 when a change has occurred so that the director boards 101-109 may recopy the table 240 from the global memory 164 (or otherwise reestablish the table 240).

Figure 10:
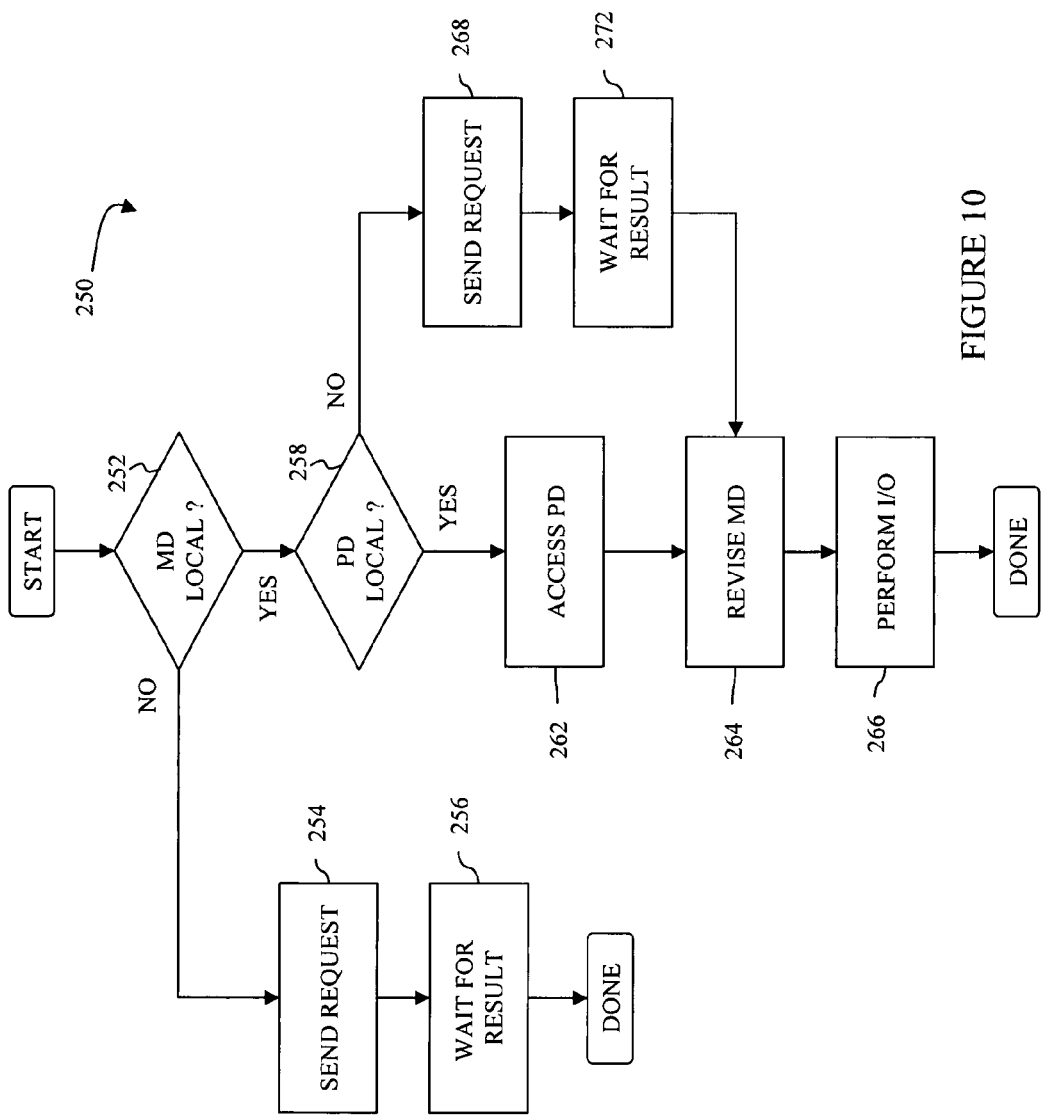
FIG. 10 is a flow chart illustrating steps performed in connection with an emulation instance of a director board handling logical device I/O requests according to an embodiment of the system described herein.

Referring to FIG. 10, a flow chart 250 illustrates steps that may be performed by a director emulation instance on a director board to handle a logical device I/O request. The request may be initiated by a host coupled to the particular director board or by a director emulation instance on another director board (e.g., via the interconnect fabric 122). For example, a request may be presented by a host coupled to the director board 101 via the link 131. Note, however, that other types of devices may be coupled to a director board via a corresponding link, including other storage devices/storage arrays (e.g., remote storage devices used in connection with RDF transfers). For convenience, the director board to which the logical I/O operation is presented by a host or other device is referred to below as the "current director board".

Processing begins at a first step 252 where it is determined if the metadata corresponding to the logical device is local to the current director board (i.e., is a native global memory access). The test at the step 252 may be performed by, for example, consulting a table like the table 240, described above. If it is determined at the test step 252 that the metadata for the logical device is not part of the global memory space that is local to the current director board, then control transfers from the test step 252 to a step 254 where the I/O request is provided to a different director board that contains the portion of the global memory that includes the metadata for the logical device. The I/O request may be made by providing, via the interconnect fabric 122, an appropriate data structure (e.g., identifying the source director and request type). Following the step 254 is a step 256 where the result of the request is received by the current director board (i.e., from a director emulation instance on the other director board that serviced the request). The current director board may then provide the result to the entity that initiated the request, such as a host coupled to the current director board. In an embodiment herein, the other director board that services the request may also provide status information, such as error messages, that are passed on to the current director board.

If it is determined at the test step 252 that the metadata for the logical device is part of the local global memory space of the current director board, then control transfers from the test step 252 to a test step 258 where it is determined if the physical device that contains the data for the logical device being accessed is coupled to the current director board. If so, then control transfers from the test step 258 to a step 262 where the current director board accesses the physical device. Note that there may be metadata associated with physical device accesses, but that physical device metadata may be different from logical device metadata.

Following the step 262 is a step 264 where the metadata is modified as appropriate, depending on the type of I/O operation and mechanism used for I/O operations. For example, if the I/O operation is to read a track of a logical device, the processing at the step 264 may include copying a track of data from a physical storage device into a cache slot in the global memory 164. Following the step 264 is a step 266 where the I/O operation is completed. The specific processing at the step 266 depends upon the type of I/O operation being performed on the logical device and mechanisms used in connection therewith. For example, if the I/O operation is a write, the processing performed at the step 266 may include returning status information (e.g., success, error) to the device that initiated the I/O operation (e.g., host). Following the step 266, processing is complete.

If it is determined at the test step 258 that the physical device is not local to the current director board, then control transfers from the step 258 to a step 268 where the current director board sends to another director board a request to access the data. The other director board may be the director having the physical storage device coupled thereto. The I/O request may be made by providing, via the interconnect fabric 122, an appropriate data structure (e.g., identifying the source director board/emulation instance and request type). The appropriate director board may be determined using, for example, the table 240. Following the step 268 is a step 272 where the result of the request is received by the current director board from the other director board that serviced the request. Following the step 272, control transfers to the step 264, discussed above.

Thus, a logical device I/O request may be presented to a director emulation instance on a first director board, but forwarded to a second director emulation instance on a second director board if the second director board includes a portion of the global memory that contains metadata for the logical device. In addition, if the physical device that contains data for the logical device is coupled to a third director different from the first and second director boards, it is possible to forward the request for the physical data to the third director board. Note also that, in some embodiments, it is possible for an I/O request to span multiple partitioned storage subsystems so that, for example, an I/O request for the partitioned storage subsystem 144 may be initiated by the partitioned storage subsystem 145.

Note that, in some instances, data may have already been fetched in connection with a recent prior I/O operation and thus may already be stored in the cache of the current director. In such a case, the data is accessed from the cache and the processing illustrated by the flow chart 250 may be circumvented. Alternatively, a determination of whether desired data is in the cache may be included as part of the test step 252 and/or part of the test step 258, thus avoiding unnecessarily avoiding requesting the data from another director via the interconnect fabric 122.

Referring to FIG. 11, a possible data structure 280 is shown for forwarding I/O requests from one director board to another via, for example, the interconnect fabric 122 (e.g., the step 254 of the flowchart 250, described above). The data structure 280 includes a caller field that identifies the director board/emulation instance that initiated the request, a request field that identifies the type of request, and a data field for providing any data that is part of the request (e.g., data provided with a write I/O request). Of course, any appropriate data structure and/or data passing mechanism may be used for transferring I/O requests.

Note also that the same or a similar data structure may be used for passing I/O requests to a director board coupled to a physical storage device (e.g., the step 268 of the flowchart 250, described above). It is also possible to use a different data structure. In some embodiments, it may be possible to include a separate field that identifies the requestor while in other embodiments requestor information may be integrated into the request field. In instances where the interconnect fabric 122 is implemented using an IP network, the data structure 280 may be implemented using a TCP/IP packet structure.

Referring to FIG. 12, a possible data structure 290 is shown for returning to a director board/emulation instance information and/or data via, for example, the interconnect fabric 122 (e.g., the step 256 of the flowchart 250, described above) in connection with servicing a request. The data structure 290 includes a responder field that identifies the director board/emulation instance that is returning the information/data, a status field that identifies the result of servicing the request (e.g., success, error), and a data field for providing any data that is being returned (e.g., data returned in response to a read I/O request). Of course, any appropriate data structure and/or data passing mechanism may be used for returning information/data.

Note also that the same or a similar data structure may be used for returning information/data from a director board coupled to a physical storage device (e.g., the step 272 of the flowchart 250, described above). It is also possible to use a different data structure. In some embodiments, it may be possible to include a separate field that identifies the destination director board/emulation instance while in other embodiments the destination director board/emulation instance may be integrated into the status field. In instances where the interconnect fabric 122 is implemented using an IP network, the data structure 290 may be implemented using a TCP/IP packet structure.

As mentioned elsewhere herein, it is advantageous to provide redundancy so that a partitioned storage subsystem may continue operation even after failure of a component. Thus, the director boards that make up the partitioned storage subsystem may provide redundant storage functionality for a set of logical devices. For a particular logical device, Dx, used in connection with a partitioned storage subsystem having, for example, two director boards, a first one of the director boards may act as the primary director board while a second one of the director boards acts as a secondary director board. The primary director board (first director board) may contain all of the director emulation instances that perform the necessary processing to access physical data and manipulate the associated metadata. If all components are operational, the secondary director board (second director board) would not contain director emulations that perform any steps in connection with the logical device Dx except to receive data from the primary director board so that the global memory of the secondary director board mirrors the global memory of the primary director board. Mirroring the global memory allows the secondary director board to take over handling I/O's for Dx if the primary director board fails.

Figure 13:
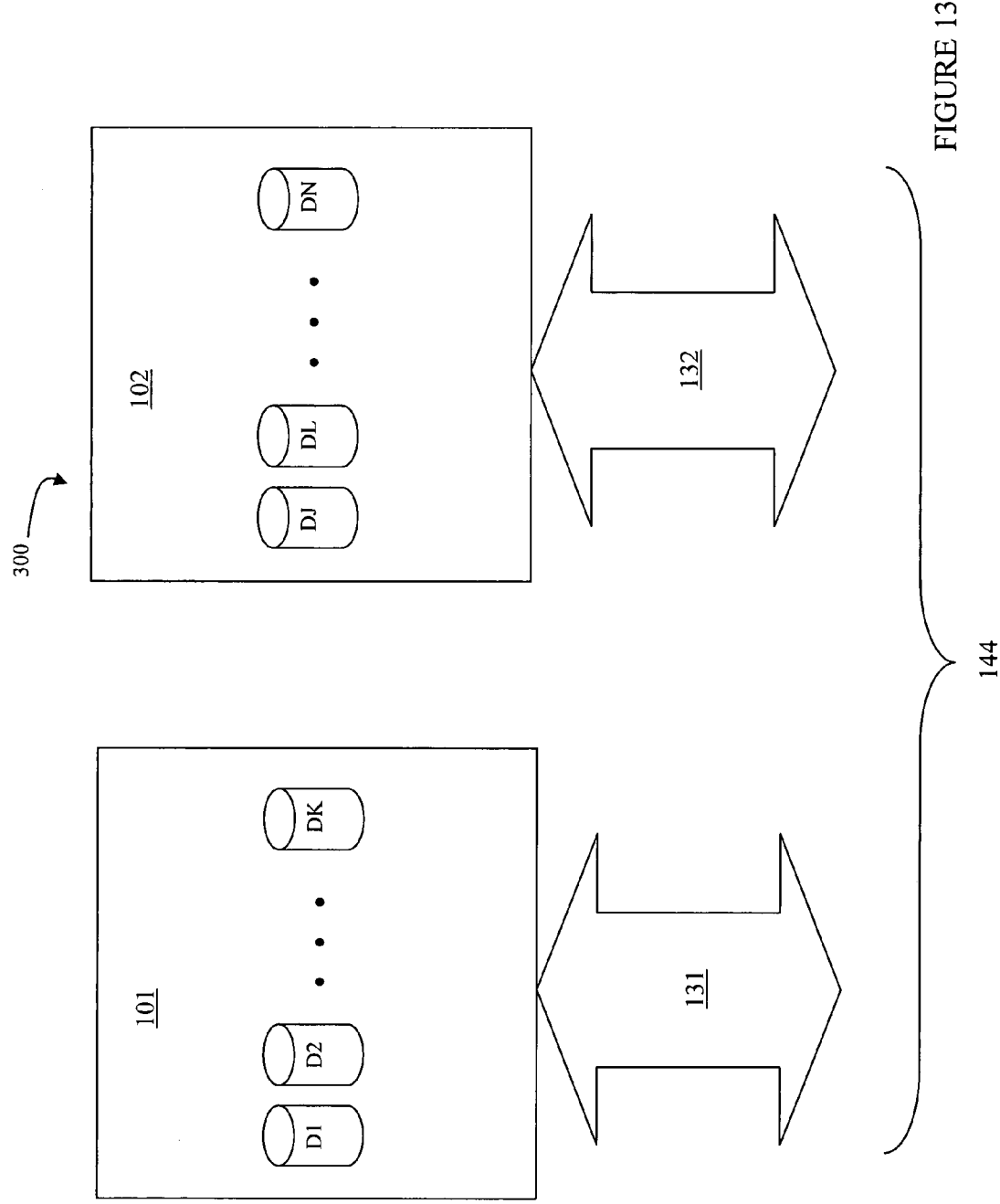
FIG. 13 is a diagram illustrating assigning groups of logical devices to different primary director boards according to an embodiment of the system described herein.

Referring to FIG. 13, a diagram 300 illustrates the partitioned storage subsystem 144 that includes the director boards 101, 102. The partitioned storage subsystem 144 is shown as including N logical devices, D1-DN. Of course, it would be possible to have one of the director boards 101, 102 be the primary director board for all of the logical devices D1-DN while the other one of the director boards 101, 102 be the secondary director board for all of the logical devices D1-DN. However, in such a case, the primary director board would contain all the director emulations that handle all of the operations associated with the logical devices (e.g., accessing physical devices, manipulating metadata, etc.) while the secondary director board would be simply receiving data from the primary director board to mirror the global memory thereof. Accordingly, the secondary director board would be relatively less busy than the primary director board. It is desirable to be able to balance the work between the primary director board and the secondary director board.

The N logical devices of the partitioned storage subsystem 144 may be divided into two sets of logical devices: a first set of D1-DK logical devices and a second set of DJ-DN logical devices (where J=K+1). For the first set, D1-DK, the director board 101 is the primary director board containing the director emulation instances that handle operations therefor while the director 102 is the secondary director board. For the second set of logical devices, DJ-DN, the director board 102 is the primary director board containing the director emulation instances that handle operations therefor while the director board 101 is the secondary director board. In this way, the amount of processing may be more evenly distributed between the director boards 101, 102. In an embodiment herein, K may be approximately equal to N/2, so that, as shown in FIG. 13, the director board 101 is the primary director board for approximately half of the logical devices while the director board 102 is the primary director board for the remainder of the logical devices. The distribution of logical devices/primary director boards may be termed "asymmetrical" because neither of the director boards 101, 102 is the primary director board for all of the logical devices.

Figure 14:
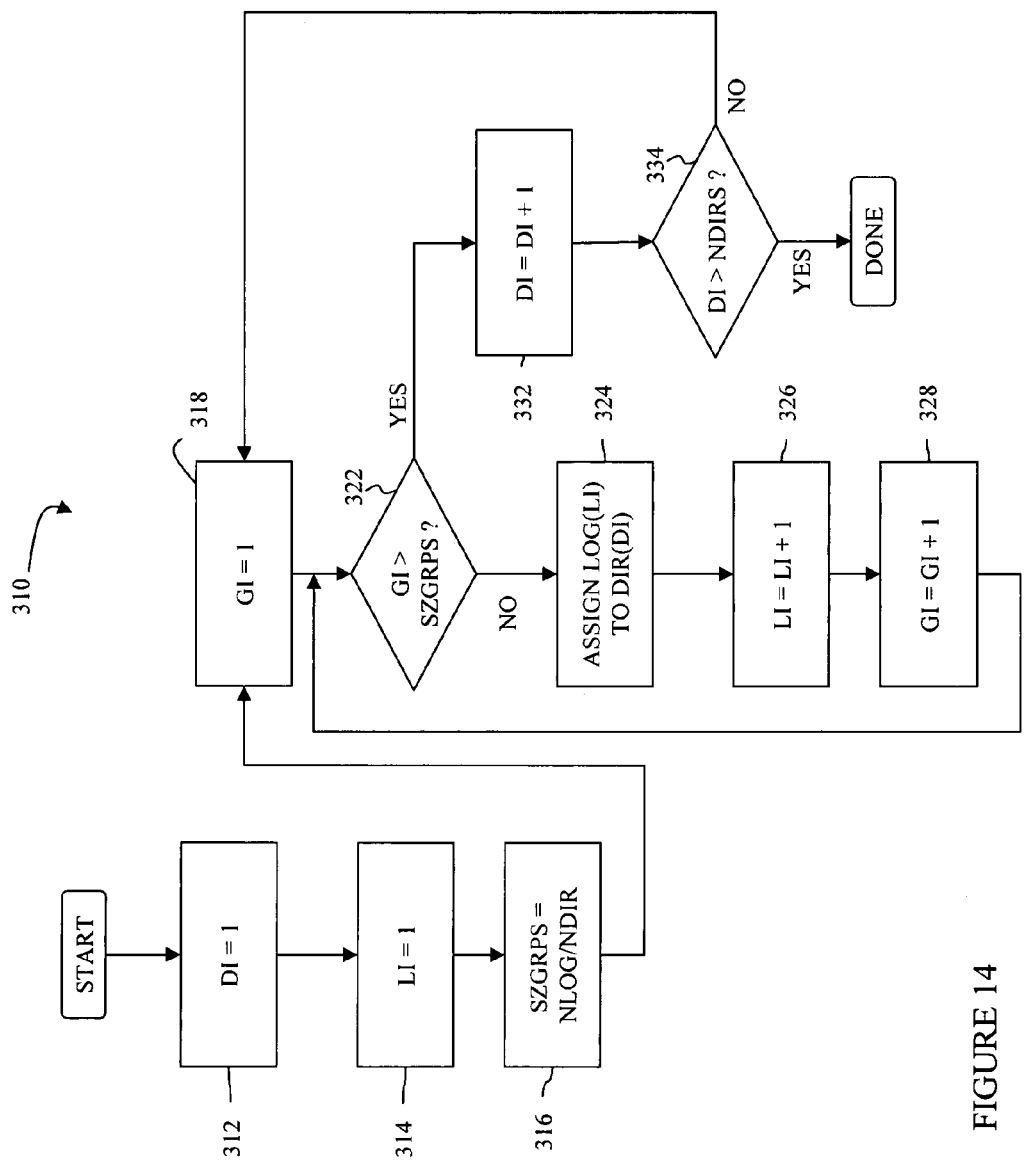
FIG. 14 is a flow chart illustrating assigning groups of logical devices to different primary director boards according to an embodiment of the system described herein.

Of course, other criteria may be used for associating particular logical devices with particular primary director boards. For example, the sets of logical devices may be configured to balance the average number of I/O accesses for each of the sets. The associations may be performed as part of the initial configuration of a partitioned storage subsystem and/or may be performed dynamically and may be possibly based, at least in part, on runtime conditions. Note also that the primary director board allocation mechanism may be extended to partitioned storage subsystems having any number of director boards associated therewith. Note also that the application of this is not limited to partitioned storage subsystems and may be extended to other types of storage devices Referring to FIG. 14, a flow chart illustrates steps performed in connection with assigning logical devices to primary director boards. The processing illustrated by the flow chart 310 distributes NLOG logical devices among NDIR director boards. Thus, if there are one hundred logical devices and four director boards, the processing illustrated by the flow chart 310 would cause each of the four director boards to be the primary director board for twenty-five of the logical devices. The processing illustrated by the flow chart 310 may be performed by processors of one of the director boards 101-109 (e.g., the processors 153) or by some other processor and may be performed either once (at initialization) or periodically (e.g., as logical devices are dynamically created and destroyed).

Processing begins at a first step 312 where an index variable, DI, is initialized to one. The index variable, DI, may be used to iterate through all of the director boards. Following the step 312 is a step 314 where another index variable, LI, is initialized to one. The index variable LI may be used to iterate through the logical devices. Following the step 314 is a step 316 where a value, SZGRPS, is calculated. The value SZGRPS corresponds to the number of logical devices for which a particular director board is to be the primary director board. Following the step 316 is a step 318 where an index variable, GI, is set to one. The index variable GI is used to count the number of logical devices for which a particular director board is to be the primary director board.

Following the step 318 is a test step 322 where it is determined if GI is greater than SZGRPS. If not, then control transfers from the step 322 to a step 324 where a particular logical device, indicated by LOG(LI) is assigned to a particular director board, indicated by DIR(DI), so that DIR(DI) is the primary director board for LOG(LI). Any appropriate mechanism may be used to cause a particular director board to be a primary director board of a logical device, including using a table or setting a device flag for the logical device. Of course, the actual mechanism that is used depends upon the specific implementation of the system. Following the step 324 is a step 326 where the index variable, LI, is incremented. Following the step 326 is a step 328 where the index variable, GI, is incremented. Following the step 328, control transfers back to the test step 322, discussed above.

If it is determined at the test step 322 that GI is greater than SZGRP (i.e., the number of logical devices for which DIR (DI) has been made the primary director board is greater than the desired number determined at the step 316), then control transfers from the step 322 to a step 332 where the index variable DI is incremented. Following the step 332 is a step 334 where it is determined if the index variable, DI, is greater than the number of director boards, NDIR. If so, then processing is complete. Otherwise, control transfers back to the step 318, discussed above, to begin another iteration.

Note that the processing illustrated by the flow chart 310 may be adapted to assign primary director boards to logical devices using different criteria. For example, if it desired to distribute primary director boards among logical devices to make the average number of accesses for each group be approximately equal, then the calculation at the step 316 may divide the total number of accesses (or expected total number of accesses) per unit time by the number of director boards. In such a case, the index variable GI may be modified to keep track of the expected number of accesses for a group of logical devices and the processing at the steps 318, 322, 328 may be modified accordingly.

Note also that it may be possible to provide a system where any of the director boards may act as a primary director board for any of the logical devices depending on run time conditions. In such a system, there may be logic that chooses a particular director board to be a primary director board for each I/O operation (or group of I/O operations) based on a current load (and/or expected load).

Figure 15:
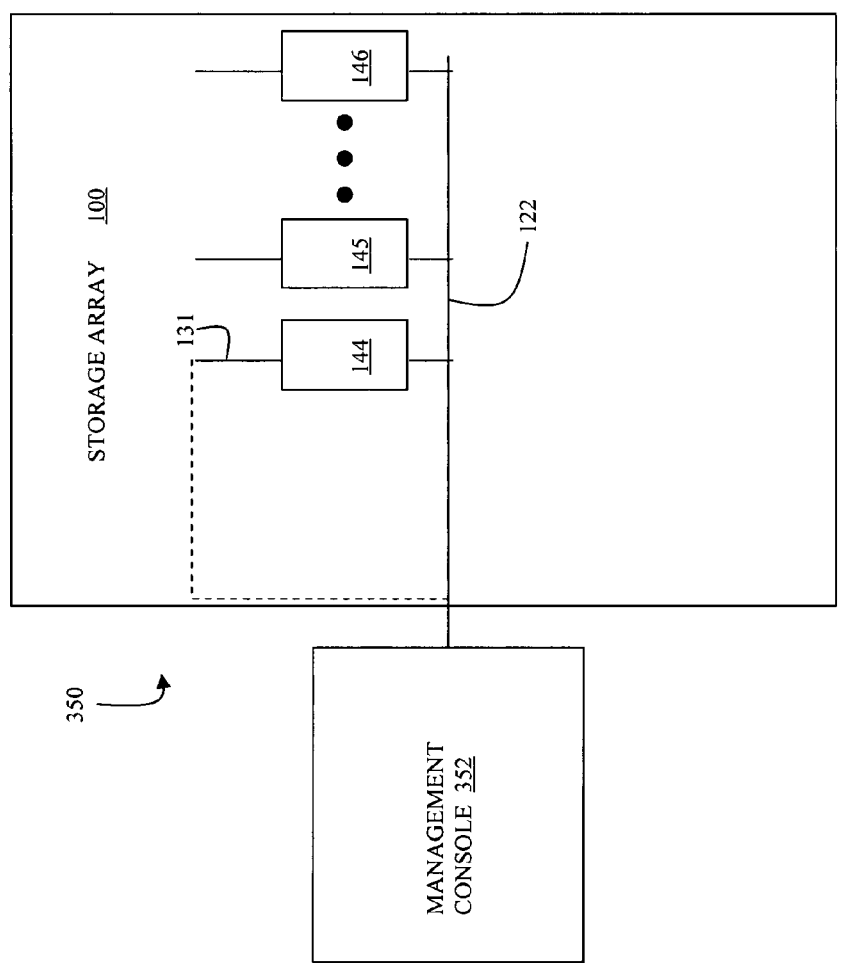
FIG. 15 is a diagram showing a management console coupled to a storage array according to an embodiment of the system described herein.

Referring to FIG. 15, a diagram 350 shows a management console 352 coupled to the storage array 100. The management console 352 may be used to manage all of the partitioned storage subsystems 144-146 of the storage array 100. The management console 352 may be coupled to the interconnect fabric 122 and/or to one of the links 131-139, such as the link 131. If the management console 352 is coupled to one of the links 131-139, then communication with partitioned storage subsystems that are not directly connected to the management console 352 may be through the partitioned storage subsystem that is directly connected and/or possibly through the interconnect fabric 122.

Although the system described herein uses tracks as a unit of data for certain purposes, it should be understood that other units of data (including, possibly, variable length units of data) may be used. This also applies to other data structures and data units. Other types of metadata for devices may be used, as well as other device table mechanisms and/or other logical device mechanisms that may not even use tables. In addition, in some instances, the order of steps in the flow charts may be modified, where appropriate. The system described herein may be implemented using software provided in a computer-readable storage medium. The computer-readable storage medium may be located on at least one of the director boards 101-109 or some other appropriate location.

While the invention has been disclosed in connection with various embodiments, modifications thereon will be readily apparent to those skilled in the art. Accordingly, the spirit and scope of the invention is set forth in the following claims.

What is claimed is:

1. A method of handling I/O operations for a storage array, comprising:
   distributing metadata among separate memories of a plurality of directors of the storage array, wherein the metadata correlates logical device data with physical device data, and wherein the separate memories include different portions of a global memory distributed among the plurality of directors, each of the different portions of the global memory being accessible by each of the plurality of directors;
   a first one of the directors receiving an I/O operation for a particular logical device;
   determining which of the plurality of directors includes the portion of the global memory that contains metadata corresponding to the particular logical device; and
   in response to the corresponding metadata being on the portion of the global memory of a different one of the directors, the first director providing a request to the different one of the directors, the request corresponding to the I/O operation for the particular logical device, wherein, although the first director is capable of accessing the portion of the global memory of the different one of the directors and servicing the I/O operation via a non-native global memory access, the first director provides the request to the different one of the directors having the portion of the global memory that contains the corresponding metadata for servicing the I/O operation via a native global memory access.

2. A method, according to claim 1, and wherein the directors are interconnected by a interconnect fabric.

3. A method, according to claim 2, wherein the first one of the directors provides a request to the second one of the directors via the interconnect fabric.

4. A method, according to claim 1, wherein determining which of the plurality of directors contains metadata corresponding to the particular logical device includes using a lookup table.

5. A method, according to claim 1, wherein the physical device data is provided by at least one disk drive coupled to at least one of the directors.

6. A method, according to claim 1, further comprising:
   determining a particular physical device that corresponds to the particular logical device;
   determining which of the plurality of directors corresponds to the particular physical device; and
   in response to the physical device corresponding to a different one of the directors, the first director providing a request to the different one of the directors.

7. A method, according to claim 1, wherein the metadata includes device tables and cache slots.

8. A method of handling I/O operations for a storage array, comprising:
   distributing metadata among separate memories of a plurality of directors of the storage array, wherein the metadata correlates logical device data with physical device data, and wherein the separate memories include different portions of a global memory distributed among the plurality of directors, each of the different portions of the global memory being accessible by each of the plurality of directors;
   a first one of the directors receiving an I/O operation for a particular logical device;
   determining a particular physical device that corresponds to the particular logical device;
   determining which of the plurality of directors includes the portion of the global memory that contains metadata that corresponds to the particular physical device; and
   in response to the corresponding metadata for the physical device being on the portion of the global memory of a different one of the directors, the first director providing a request to the different one of the directors, the request corresponding to the I/O operation for the particular logical device, wherein, although the first director is capable of accessing the portion of the global memory of the different one of the directors and servicing the I/O operation via a non-native global memory access, the first director provides the request to the different one of the directors having the portion of the global memory that contains the corresponding metadata for servicing the I/O operation via a native global memory access.

9. A method, according to claim 8, and wherein the directors are interconnected by a interconnect fabric.

10. A method, according to claim 9, wherein the first one of the directors provides a request to the second one of the directors via the interconnect fabric.

11. A method, according to claim 8, wherein determining which of the plurality of directors includes the portion of the global memory that includes metadata that corresponds to the particular physical device includes using a lookup table.

12. A method, according to claim 8, wherein the physical device data is provided by at least one disk drive coupled to at least one of the directors.

13. A method, according to claim 8, wherein the metadata includes device tables and cache slots.

14. A storage array, comprising:
   a plurality of directors, each having at least one processor thereon;
   a global memory distributed among the plurality of directors, wherein different portions of the global memory are provided on each of the directors, and wherein each of the different portions of the global memory is accessible by each of the plurality of directors;
   an interconnect fabric coupled to each of the directors, wherein global memory accesses performed by one director to access memory of another director are through the interconnect fabric; and
   metadata for logical devices, provided in the global memory, wherein the metadata contains information that correlates logical device data with physical device data and wherein, in response to an I/O operation for a particular logical device, a first director determines which of the plurality of directors includes the portion of the global memory that contains metadata corresponding to the particular logical device and, in response to the metadata being on the portion of the global memory of a different one of the directors, the first director provides a request to the different one of the directors, the request corresponding to the I/O operation for the particular logical device, wherein, although the first director is capable of accessing the portion of the global memory of the different one of the directors and servicing the I/O operation via a non-native global memory access, the first director provides the request to the different one of the directors having the portion of the global memory that contains the corresponding metadata for servicing the I/O operation via a native global memory access.

15. A storage array, according to claim 14, wherein the physical device data is provided by at least one disk drive coupled to at least one of the directors.

16. A storage array, according to claim 14, further comprising:
   a local memory, provided on each of the directors, wherein the local memory is accessed exclusively by the at least one processor of a corresponding one of the directors.

17. A storage array, according to claim 14, wherein the metadata includes device tables and cache slots.

18. A storage array, according to claim 14, wherein the interconnect fabric is implemented using an Internet Protocol (IP) network.

19. A storage array, according to claim 14, wherein each of the directors includes a interconnect fabric interface and wherein the interconnect fabric interface includes Direct Memory Access (DMA) hardware.

* * * * *